UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

979,136.  Specification of Letters Patent.  Patented Dec. 20, 1910.

No Drawing.  Application filed January 26, 1907.  Serial No. 354,165.

*To all whom it may concern:*

Be it known that I, CARLETON ELLIS, a citizen of the United States, and resident of Larchmont, Westchester county, and State of New York, have invented certain new and useful Improvements Relating to Paint or Varnish Removers, of which the following is a specification.

This invention relates to paint or varnish removers and relates especially to such removers containing esters of the lower methyl series alcohols having the formula $C_nH_{2n+2}O$ up to and including the alcohols having four carbon atoms and also their halogen and other derivatives as well as the preparation thereof.

Methyl acetate is the lowest easily available member of this series of esters. It may be prepared by treating three parts of methyl alcohol with thirteen parts of lead acetate and five parts of concentrated sulfuric acid although in place of the lead acetate, dry calcium acetate or other acetate may be employed. It is ordinarily desirable to use a slight excess of methyl alcohol in the preparation of methyl acetate and also in the prepared compound if it is allowed to stand for a considerable time in order to prevent the acetate from becoming acid through hydrolysis. Methyl acetate boils at about 58° centigrade and has an ethereal odor. It is a better general resin solvent than acetone and has a powerful solvent action on most resins. Methyl acetate, for instance, will dissolve 25% of pontianac resin while acetone takes up only 18%. Numerous halogen derivatives of methyl acetate may be obtained by treatment of the acetate with chlorin or bromin, for instance.

Some useful derivatives for use as solvents in paint or varnish removing compositions are the monochlor derivative boiling at about 115° centigrade and the dichlor derivative boiling at 145° and upward. The ethyl esters, such as ethyl acetate, are also useful solvents for such purposes. Ethyl acetate may be prepared by the treatment of a mixture of about 60 parts of acetic acid and 50 parts of grain alcohol with hot sulfuric acid. A thin stream of the above mixture may, for instance, be gradually run into a receptacle containing sulfuric acid heated to about 130° centigrade and the vapors from the resulting reaction removed and condensed. Ethyl acetate may also be prepared by treatment of 130 parts of sulfuric acid, 65 parts of grain alcohol, 100 parts of sodium acetate or an equivalent amount of other acetate, the mixture being subsequently distilled in suitable apparatus. Ethyl acetate boils at about 77° centigrade and is a useful solvent for nearly all varnish resins and since it is not quite so volatile as the methyl acetate it is more desirable on this account for some purposes. It is also liable to hydrolysis in its manufacture and subsequent utilization and it is, therefore, desirable to have a slight excess, such as a few per cent., of ethyl alcohol present to prevent, by the mass action of the added alcohol, such hydrolysis and resulting acidity. The propyl esters, such as propyl acetate, for instance, also have solvent properties of considerable value. Normal propyl acetate boiling at 100° centigrade and iso propyl acetate boiling at 90° and upward, as well as their halogen derivatives, such as the brominated products, one species of which has a boiling point of slightly over 200° centigrade, are useful in paint or varnish removers. Even less volatile solvents may be found among the butyl esters, butyl acetate having the boiling point of about 125° centigrade and its isomer iso butyl acetate boiling at about 115°. In the treatment of denatured alcohol or methylated spirit with acetic acid under esterizing conditions, mixed esters of this class and combined esteric derivatives may be produced which are very useful solvents. In addition to these esters of the lower members of the methyl series alcohols and their derivatives such as the halogen compounds, other solvents may be used in preparing paint or varnish removers. Benzol, its homologues and other generally similar solvents may be employed, together with suitable proportions of benzin, turpentine, oil of acetone and so forth, such as the strict alcohols and generally alcoholic or ketonic compounds.

Suitable stiffening material, such as wood flour, starch, whiting, fullers' earth, carbonate of magnesia or infusorial earth, or the like, may be used to give the desired consistency to the remover and also wax may be employed for this purpose and to form an impervious evaporation retarding film, although for special conditions the wax may be omitted and where the remover is used for tank work or dipping the stiffening material is preferably omitted.

The formula of an illustrative paint or varnish remover embodying such solvents is methyl acetate 45 gallons, monochlor methyl acetate 15 gallons, benzol 30 gallons, benzin 20 gallons, turpentine 5 gallons, carbonate of magnesia 100 pounds, paraffin or ceresin wax 15 pounds. The wax is preferably dissolved in the benzol and benzin by warming, the carbonate of magnesia stirred up and incorporated with the turpentine and added to the wax solution, and finally the methyl acetate and monochlor methyl acetate are gradually run in and incorporated with constant stirring.

Another illustrative formula comprises monochlor methyl acetate 10 gallons, methyl acetate 10 gallons, iso propyl acetate 10 gallons, benzol 40 gallons, ceresin or paraffin wax, about 18 pounds.

Another suitable illustrative formula is ethyl acetate 20 gallons, turpentine 10 gallons, oil of acetone 10 gallons, heavy coal tar naphtha 15 gallons, thoroughly combined and 50 pounds of fullers' earth incorporated therewith.

An illustrative formula suitable for tank work comprises methyl acetate 25 gallons, ethyl acetate 20 gallons and heavy gasolene 30 gallons, the word comprise having its usual signification when used herein which is broad enough to cover include, embrace or comprehend.

Having described this invention in connection with a number of illustrative ingredients and formulas, although of course, this invention is not limited to the details of the foregoing disclosure, what is claimed as new and what is desired to be secured by Letters Patent is set forth in the appended claims.

1. The paint or varnish remover comprising approximately methyl acetate 45 gallons, monochlor methyl acetate 15 gallons, benzol 30 gallons, benzin 20 gallons, turpentine 5 gallons, carbonate of magnesia 100 pounds and wax 15 pounds.

2. The paint or varnish remover comprising approximately methyl acetic ester 3 parts, monochlor methyl acetate 1 part, benzol and similar wax solvents 3 parts, and stiffening material including a waxy body.

3. The paint or varnish remover comprising methyl acetate, monochlor methyl acetate, a wax solvent, and stiffening material, including a waxy body.

4. The paint or varnish remover comprising methyl acetate, monochlor methyl acetate and evaporation retarding material.

5. The paint or varnish remover comprising methyl acetate and monochlor methyl acetate.

6. The paint or varnish remover comprising monochlor methyl acetate, a wax solvent and a waxy body.

7. The paint or varnish remover comprising monochlor methyl acetate and stiffening material.

8. The paint or varnish remover comprising methyl acetate and stiffening material.

9. The finish remover comprising a chlorinated derivative of methyl acetate, incorporated miscible finish solvent material and stiffening material including a waxy body.

10. The finish remover comprising a chlorinated derivative of methyl acetate and evaporation-retarding stiffening material.

11. The finish remover comprising a chlorinated derivative of methyl acetate, aromatic finish solvent material and evaporation-retarding stiffening material.

12. The finish remover comprising a chlorinated derivative of an acetate of a lower alcohol of the paraffin series, aromatic finish softening material and stiffening material.

13. The finish remover comprising a chlorinated derivative of an acetic ester of a lower alcohol of the paraffin series and incorporated aromatic finish softening material.

14. The finish remover comprising a halogen derivative of an organic acid ester of a lower alcohol of the paraffin series, incorporated finish softening material and stiffening material.

15. The finish remover comprising a halogen derivative of an ester of a lower alcohol of the paraffin series and incorporated finish softening material.

16. The finish remover comprising from thirty to fifty per cent. of halogenated methyl acetate, incorporated miscible finish solvent material including aromatic material and stiffening material.

17. The finish remover comprising from about thirty to fifty per cent. of halogenated esteric compounds of the lower paraffin series alcohols, incorporated miscible finish solvent material including benzol and waxy evaporation retarding material.

18. The substantially fluent finish remover comprising a considerable proportion of a halogenated derivative of an acetic ester of a lower alcohol of the paraffin series, miscible finish softening material and stiffening material.

19. The substantially fluent finish remover comprising a considerable proportion of a chlorinated derivative of an ester of a lower alcohol of the paraffin series and incorporated liquid finish softening material.

CARLETON ELLIS.

Witnesses:
 HARRY L. DUNCAN,
 JESSIE B. KAY.